July 31, 1962 W. W. PHARIS ET AL 3,047,679

ROUTINER

Filed June 18, 1958 4 Sheets-Sheet 1

INVENTORS.
WILLIAM W. PHARIS
ERNEST H. GATZERT
BY
ATTORNEY

July 31, 1962 W. W. PHARIS ET AL 3,047,679

ROUTINER

Filed June 18, 1958 4 Sheets-Sheet 2

July 31, 1962 W. W. PHARIS ET AL 3,047,679

ROUTINER

Filed June 18, 1958 4 Sheets-Sheet 3

July 31, 1962 W. W. PHARIS ET AL 3,047,679

ROUTINER

Filed June 18, 1958 4 Sheets-Sheet 4

3,047,679

ROUTINER

William W. Pharis and Ernest H. Gatzert, Rochester, N.Y., assignors to General Dynamics Corporation, Rochester, N.Y., a corporation of Delaware Filed June 18, 1958, Ser. No. 742,801
15 Claims. (Cl. 179—175.2)

This invention relates to test equipment and more particularly to routiners for telephone subscriber lines.

Conventionally, telephone systems may be arranged to provide for extending calls between subscriber lines, many central exchanges providing service for as many as ten thousand lines. Each subscriber line should be tested, usually at routine intervals, for various predictable faults such as short circuits and insulation faults that provide low resistance paths either to foreign battery or ground potentials. In the past, it has been common practice to provide "routiners" comprising switch trains for sequentially seizing each subscriber line after which any suitable equipment may test the line.

In the past, various difficulties have been experienced in connection with such routiners. For example, occasionally a test switch train does not step accurately so that it is not connected with the line which is indicated to maintenance personnel. Since routiners are large expensive items, it is desirable to use one centrally located, common control unit for operating test switch trains in each of a plurality of offices. However, in conventional systems, test switch trains in some offices may require four digits to select a subscriber line while test switch trains in other offices may require three digits. Therefore, if the same control unit is used to direct switch trains in both offices, some means must be provided for selectively transmitting either three or four digit pulse trains. Still other problems have centered about a need for fully automatic test equipment to avoid having maintenance personnel present to start routiners, to check faults as they are indicated, and the like.

An object of this invention is to provide new and improved line routiners.

Another object of this invention is to provide for fully automatic line testing.

Still another object of this invention is to provide for checking the accuracy with which a test switch train is stepped.

Yet another object of this invention is to provide common control units for directing test switch trains which may require a variable number of digits to seize lines for routine testing.

This invention accomplishes these and other objects by providing a common control unit for directing test switch trains during routine testing. The control unit may be seized from any of a plurality of locations, such as central and remote offices, each of which is wired to transmit distinctive markings for indicating such things as the number of digits that are required to control a test switch train, or the like. Thereafter, a register in the common control unit is operated step-by-step to indicate subscriber line numerical designations for the office that is being tested. On each step, a signal is sent to a test switch train in that office for causing another subscriber line to be connected to a test device associated with the common control unit.

Particular sets among the terminals which afford access to subscriber lines may be marked to give electrical indications when seized by test switch trains. The register which controls the test switch trains is also provided with a bank of terminals which have been wired to indicate the numerical designation of such particular sets of terminals. If the signals indicating that the switch trains have reached such particular sets of terminals coincides with registration of the numerical designation of such terminals, it is an indication that the switch trains have been stepped accurately.

The common control unit may be started by many different means to enable fully automatic testing. For example, an individual may dial a first number for priming a starting circuit after which a predetermined period of time is measured. If a second number is dialed within the predetermined time period, the routine testing is started. Other starting means may include clock controlled mechanisms, humidity sensing devices, or the like.

Suitable recording devices, such as a printer for example, may make a record of all faults so that testing is fully automatic.

Further objects and advantages of the invention may be understood by referring to the following description when taken in connection with the accompanying drawings in which:

FIG. 1 illustrates a central office;
FIG. 2 shows a remote office;
FIGS. 3 and 4 illustrate a common control circuit; and
FIG. 5 illustrates the manner in which FIGS. 1–4 should be arranged to provide a complete and understandable circuit.

Simple and specific terms have been used wherever possible to faciliate an understanding of the invention; however, it should be understood that the use of such simple and specific terms is not to act in any manner as a disclaimer of the full range of equivalents which is normally given under established rules of Patent Law. To illustrate, the drawings show a timer in the form of a heating element which is adapted to close contacts after the expiration of approximately two minutes. Obviously, other time periods may be provided and other devices such as a clock motor, pulses from an interrupter cam, or the like could be used to provide such timing. Also, routiners are very large and complicated circuits, a complete description of which would require a vast number of drawings and a very extensive specification. Since routiners generally are old and known to those skilled in the art, the disclosure has been limited to circuits which are necessary for an understanding of the novel features. Various switches are shown in the drawing as conventional minor switches that have a plurality of levels, e.g., the register has been shown as four switches, each having at least two banks and brushes adapted to be stepped synchronously thereover. The scanner is shown as a switch of any convenient design having four banks, each being wired to a separate register switch. The scanner is, therefore, reoperated with different levels effective for use in connection with units, tens, hundreds and thousands register switches. Other register and scanner switch arrangements could be used. Further, the attached drawings show the source of office potential by means of (+) and (−) signs. As in most telephone systems, the (+) terminal is described as being connected to ground; however, it should be understood that any other suitable power supply may be used. Quite obviously, other examples could be selected to illustrate the manner in which the specific terms that have been used are entitled to a wide range of equivalents.

*Brief Description*

Referring first to FIG. 1, there is shown a portion of a central office which may be used to complete calls in a conventional manner. For example, subscriber A1 may wish to call subscriber B1 in which case subscriber A1 removes his receiver, thereby completing a loop to mark line circuit 101 as serving an unanswered calling line. Thereafter, allotter 103 and line finder 102 cooperate to seize line circuit 101 and extend dial tone thereto. Responsive to hearing dial tone, the calling subscriber may dial to transmit digit pulses that indicate the directory number of subscriber station B1 for controlling switches 102 and 104 in a conventional manner.

FIG. 2 illustrates a remote office that may be associated generally with the central office of FIG. 1. For example, the central office may be located in a downtown portion of a large metropolitan area while the remote office may be in an outlying suburb. Therefore, it is desirable to provide a common control unit to direct the test switch train in each office.

*Initial operation of test switch train.*—For the purposes of this description, it is assumed that a two rank, test switch train, 106 and 107, of the central office requires four digits while a two rank, test switch train, 206 and 207, of the remote office requires three digits, the difference being that switch 106 operates in two directions while switch 206 operates in one direction. Thus, it is seen that the common control unit of FIGS. 3 and 4 must be adapted to furnish four digit control to the central office and three digit control to the remote office. That is, if contacts 252 and 257 are provided, the thousands register is not effective. Means is also provided to cancel tests on any unused level in the various switch trains. For example, if strapping THC and contacts 256 are provided, any desired thousands digits may be canceled, while if strapping HDC and contacts 255 are provided, any desired hundreds digits may be canceled.

Many different schemes may be used to start the routiner. For example, the central office (FIG. 1) has been shown as having four starting circuits ST1–ST5. If switch ST5 is connected with terminal ST1, the routiner may be started by dialing, as during a conventional call, whereupon test terminals T12 are seized and a suitable signal is transmitted over an extra sleeve conductor to operate office #1 relay 150, whereupon testing starts. If switch ST5 is connected with terminals ST2, a hygrometer is arranged to operate office #1 relay 150 when the outside atmosphere has exceeded a certain percent of relative humidity since troubles are encountered most often during wet or damp conditions. If switch ST5 is connected with terminal ST3, a clock and/or calendar arrangement may be provided to operate office #1 relay 150 at some predetermined time, such as at midnight or during some low call density day. If the switch ST5 is connected with terminals ST4, as shown, the routiner is arranged to be started manually by switch MS11.

Start circuit 200, shown in FIG. 2, is arranged for remote starting, whereby a person at any suitable location, such as the central office, dials a directory number which gives access to priming terminals 209*a*. Responsive thereto, a period of time is measured by timing device 220 during which the person must hang up and redial to seize start terminals 209*b*. The routiner is started responsive thereto.

After the routiner starts, the register and scanner of FIG. 4 cooperates to direct a test switch train, such as test selector 106 and test connector 107 (or test selector 206 and test connector 207) to seize each subscriber line in a preestablished sequence, whereupon test circuit TC41 tests for certain faults.

If test selector 106 and test connector 107 operate in a proper manner, recognition circuit 5345 (FIG. 1) is seized when the directory number thereof is indicated in register bank #2. Therefore, if it is assumed that switches 106 and 107 have been stepped properly, a circuit is completed for operating test check relay 430 which closes contacts 431, thereby connecting sleeve relay 440 to conductor SN of the recognition circuit. A coincidence between these events indicates that the test switch train has been stepped properly.

It may be desirable to provide means for releasing a test connector without releasing an associated test selector. For example, if it is assumed that test selector 106 is standing in contact with the eighth set of terminals in any given level, it would waste time to release test selector 106 and reoperate it to select the ninth set of terminals in that same level. It is much simpler to advance selector 106 a single step, thereby avoiding the wear and waste of time required by useless level selecting movements. Therefore, resistance battery is connected through resistors R11 and R12 to hold relay 120. Responsive thereto, contacts 121 remain closed for holding test selector 106. Relay 130 is shunted and releases, whereupon contacts 131 close to release test connector 107. Resistance battery is applied to both conductors T and R so that it makes no difference whether relay 110 has or has not operated to reverse battery.

*Detailed Description*

Figure 3:
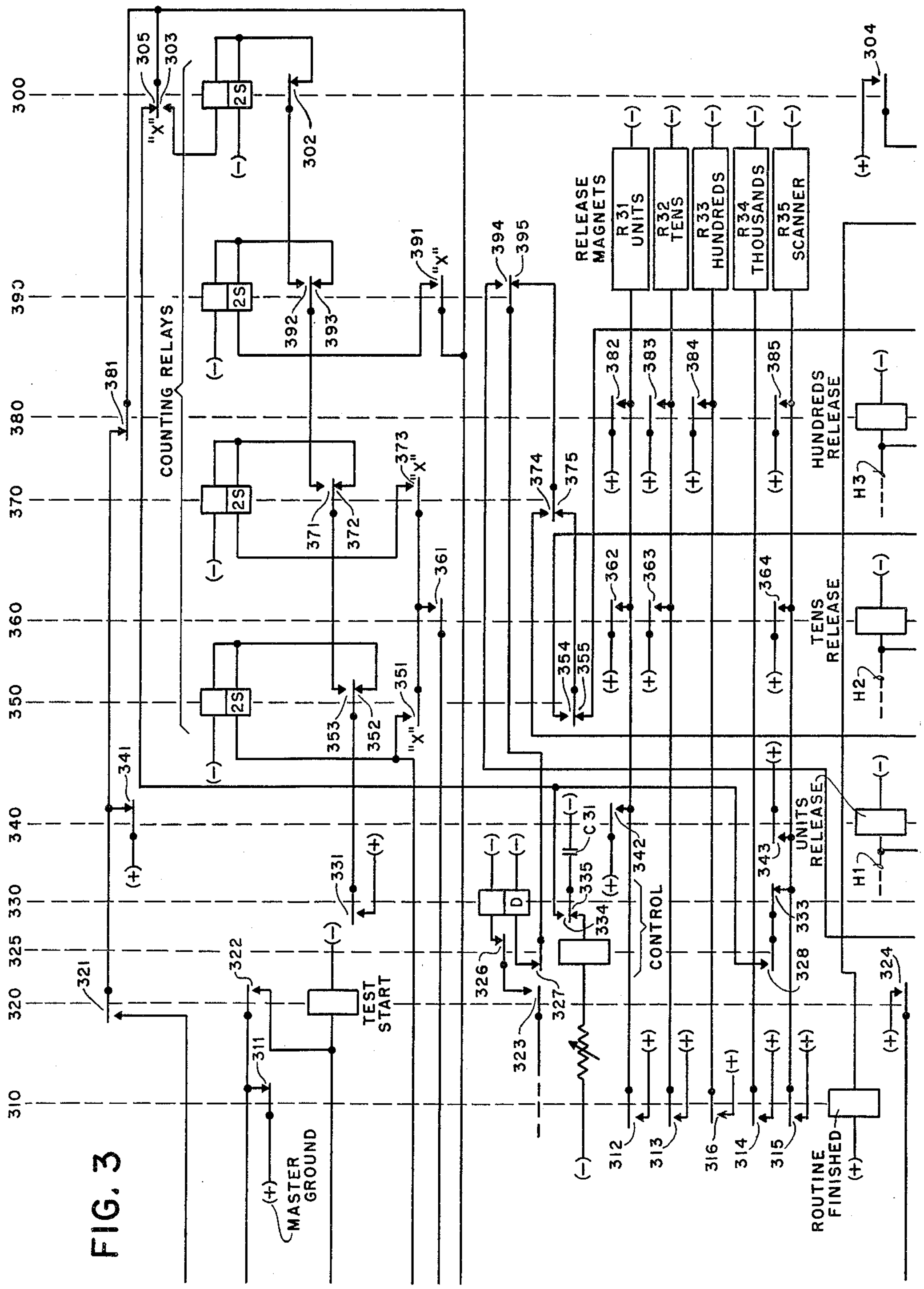
Figure 4:
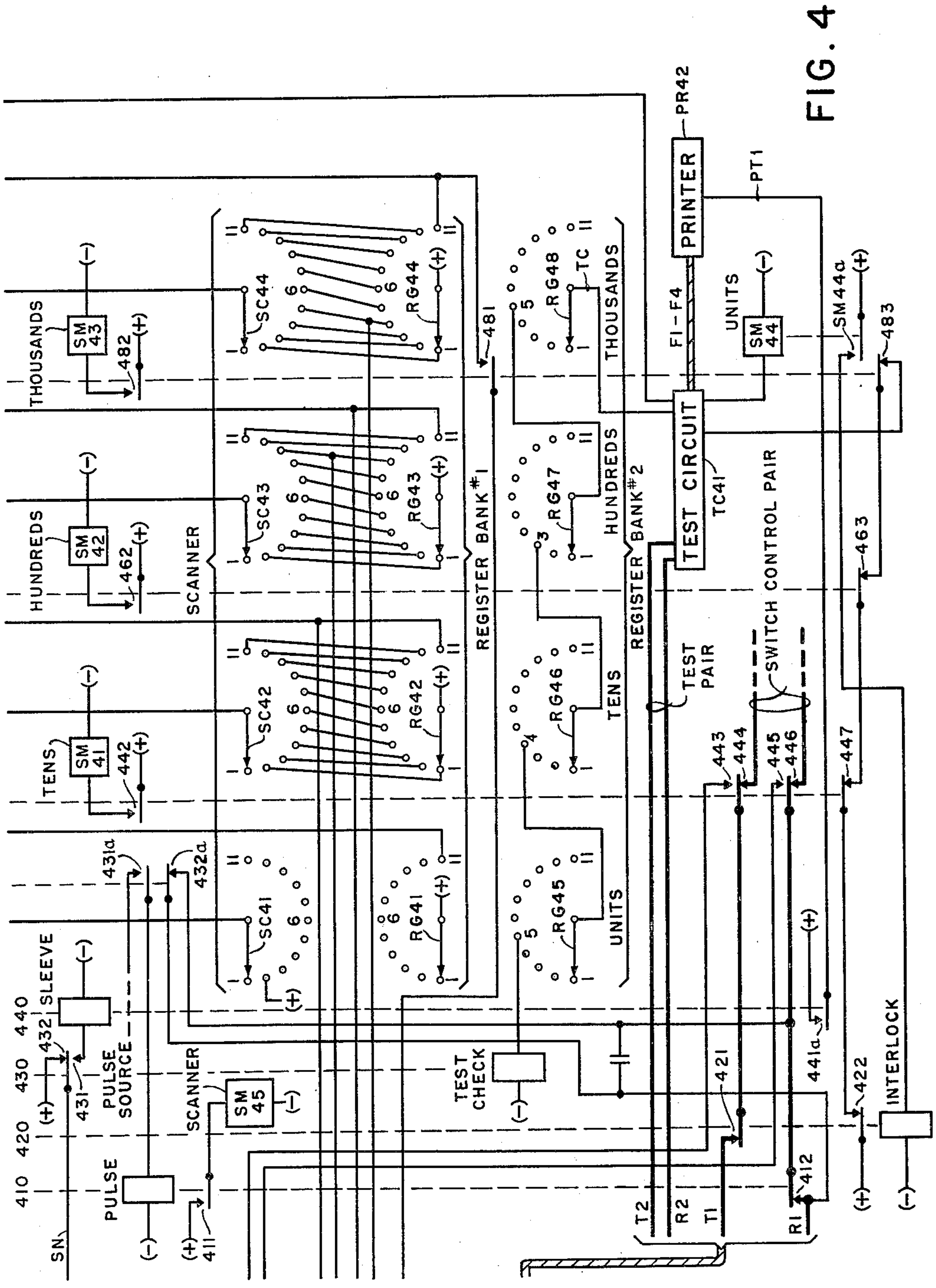

As pointed out above, the common control unit of FIGS. 3 and 4 may be seized by many different means. For the purposes of this description, it is assumed that manual switch MS11 is operated to complete a circuit from (−) battery through terminal ST4, brush ST5, and the winding of office #1 relay 150 to ground (+) at contacts 311.

Office #1 relay 150 operates and contacts 151 close to operate test start relay 320 over an obvious circuit. Contacts 152, 153, 152*a* and 153*a* close, thereby connecting the common control unit of FIGS. 3 and 4 to the central office over the heavily inked conductors. Contacts 154 close to lock office #1 relay 150 in an operated condition. Contacts 155 and 156 close to prepare a circuit for releasing test connector 107 while holding test selector 106, later during the call. Contacts 157 close to prepare a locking path for various counting relays. Contacts 158 extend busy markings in any suitable manner to mark the common control circuit of FIGS. 3 and 4 as busy.

Responsive to the operation of test start relay 320, contacts 321 and 324 operate but have no effect while the central office (FIG. 1) is being tested. Contacts 322 close to lock test start relay 320 in its operated condition. Contacts 323 close to operate differential control relay 330 over any suitable circuit (not shown) including its upper winding.

Responsive to the operation of control relay 330, contacts 334 close to charge capacitor C31 over a circuit extending from (−) battery through capacitor C31, contacts 334, 305, 381 and 341 to ground (+). Contacts 333 have no effect at this time. Contacts 432*a* open thereby unshunting the pulsing contact 412 for reasons pointed out below. Contacts 431*a* connect any suitable pulse source (not shown) to operate pulse relay 410. The pulse source is a free-running device adapted to generate pulses which simulate those of a telephone dial. Contacts 331 close, thereby extending a circuit from ground (+) through contacts 352 and the upper winding of relay 350 to (−) battery.

As indicated in the drawing by the designation "2S," relay 350 is a two-step relay which is adapted to be operated to its first step when energized over its upper winding. Only contacts 351 are operated by relay 350 on its first step as indicated by the letter "X." Responsive thereto, the lower winding of relay 350 is rendered ineffective since it is shunted over a circuit which extends from ground (+) through contacts 331, 352, the lower winding of relay 350, "X" or preliminary contacts 351, 361, 157 and ground (+).

Responsive to the first operation and release of relay 410 as it is driven by the pulse source, contacts 412 open and close, thereby transmitting an open loop, dial pulse to test selector 106 which is stepped to its first level. Contacts 411 close to operate scanner switch stepping magnet SM45 over an obvious circuit.

Responsive to the operation of scanning switch stepping magnet SM45, brushes SC41–SC44 are driven one step. Brush SC44 completes a circuit extending from ground (+) through brush RG44, brush SC44, contacts 355, 375, 395, 327 and the lower winding of differential control relay 330 to (−) battery. Relay 330 is differentially energized and therefore releases, thus closing contacts 432*a* to shunt pulsing contacts 412 so that no further digit pulses may be transmitted to test selector 106. Contacts 431*a* open to disconnect the pulse source from pulse relay 410. Contacts 333 close to prepare a circuit for the scanner release magnet.

When relay 330 operated, contacts 334 closed to charge capacitor C31 as explained above. When relay 330 releases, as just described, contacts 335 close and relay 325 operates responsive to and for the duration of a surge of discharging current emanating from capacitor C31. During the period determined by such discharging current, contacts 328 close to operate the scanner release magnet R35 over a circuit extending from (−) battery through the winding of magnet R35, contacts 333, 328, 305, 381 and 341 to ground (+). Contacts 326 and 327 open to prevent reoperation of relay 330 for a period of time measured by the discharging of capacitor C31 which is long enough to provide a normal interdigit delay period. After capacitor C31 has discharged sufficiently, relay 325 releases.

Returning to the release of control relay 330, contacts 331 open to break the shunt through the lower winding of relay 350, thus causing it to operate to its second step over a circuit which may be traced from (−) battery, through the upper and lower windings of relays 350 in series, contacts 351, 361 and 157 to ground (+).

Responsive to the operation of relay 350 to its second step, contacts 355 open and 354 close, thereby transferring the control of differential relay 330 from the thousands register switch to the hundreds register switch. Also responsive to the operation of contacts 355, the differentially energizing circuit through the lower winding of control relay 330 is broken, thereby causing it to reoperate over its upper winding after relay 325 releases contacts 326. Contacts 352 open and 353 close to prepare a circuit for the second counting relay 370.

Responsive to reoperation of differential control relay 330, contacts 331 close to complete a circuit for operating relay 370 to its first step which may be traced from ground (+) through contacts 331, 353, 372 and the upper winding of relay 370 to (−) battery. The lower winding of relay 370 is shunted over a circuit extending from ground (+) through contacts 331, 353, 372, the lower winding of relay 370, "X" contacts 373 (relays 370 being operated to its first step), contacts 361 and 157 to ground (+). Also responsive to operation of relay 330, contacts 334 close to charge capacitor C31; contacts 432*a* open to unshunt contacts 412; and contacts 431*a* close to connect relay 410 to a pulse source.

Relay 410 operates and releases responsive to the first pulse received from the pulse source, thereby closing contacts 411 to operate scanner switch stepping magnet SM45 and opening contacts 412 to transmit an open loop digit pulse to drive test selector 106 one step into the level in its bank of contacts that was selected responsive to the thousands digit. Scanner brush SC43 is driven one step where it encounters a ground marking and completes a circuit from ground (+) on brush RG43 through brush SC43, contacts 354, 375, 395, 327, and the lower winding of control relay 330 to (−) battery.

Relay 330 is differentially energized and releases. In doing so, it closes contacts 432*a*, to reshunt pulsing contacts 412 and opens contacts 431*a* to disconnect pulse relay 410 from the pulse source. When contacts 335 close, relay 325 operates for the duration of discharging current from capacitor C31 to give an interdigit pulse time. Contacts 333 close to operate the scanner release magnet over the circuit extending from (−) battery through winding R35, contacts 333, 328, 305, 381 and 341 to ground (+). Contacts 331 open to break the shunt circuit around the lower winding of second counting relay 370, thus causing it to operate to its ssecond step over a circuit which may be traced from (−) battery through the upper and lower windings of relay 370 in series, contacts 373, 361, and 157 to ground (+).

Responsive to the operation of relay 370 to its second step, contacts 375 open to break the circuit to the lower winding of differential control relay 330. After capacitor C31 discharges sufficiently, relay 325 releases and closes contacts 326 to reoperate relay 330 over its upper winding. Also responsive to operation of relay 370, contacts 374 close to transfer control of relay 330 to the tens scanner switch brush SC42. Contacts 371 operate to prepare a circuit for the third counting relay 390.

Responsive to the reoperation of control relay 330, contacts 331 close to complete a circuit which may be traced from ground (+) through contacts 331, 353, 371 and 393 through the upper winding of third counting relay 390 to (−) battery. Relay 390 is adapted to operate only its "X" contact 391 when energized in this manner. The lower winding of relay 390 is shunted at this time over a circuit which may be traced from ground (+) through contacts 331, 353, 371, 393, the lower winding of relay 390, contacts 391, 381 and 341 to ground (+). Also responsive to operation of relay 330, contacts 432*a* open to break the shunt around pulsing contacts 412. Contacts 334 close to charge capacitor C31 over a circuit including contacts 334, 305, 381 and 341. Contacts 333 have no effect at this time. Pulse relay 410 is connected to the pulse source when contacts 431*a* close.

Responsive to the first pulse that is received from the pulse source, pulse relay 410 operates and releases to open contacts 412 and transmit a digit pulse to drive test connector 107 a first step in its primary direction. Contacts 411 close to operate scanner switch stepping magnet SM45 for driving brush SC42 one step.

On the first step, scanner switch brush SC42 completes a circuit from ground (+) extended through register brush RG42 in its normal position, scanner brush SC42, operated contacts 374, 395, 327 and the lower winding of differential relay 330, to (−) battery thus causing it to be differentially energized and to restore.

Responsive to the restoration of control relay 330, contacts 331 open to break the shunt around the lower winding of third digit counting relay 390, thus causing it to operate to its second step over the circuit which may be traced from (−) battery through the upper and lower windings of relay 390, contacts 391, 381 and 341 to ground (+). Contacts 431*a* open to disconnect relay 410 from the pulse source while contacts 432*a* close to shunt pulsing contacts 412. Contacts 335 close to operate relay 325 while capacitor C31 discharges to provide an interdigit time period. Contacts 333 close to operate scanner release magnet R35 over the circuit extending from (−) battery through winding R35, contacts 333, 328, 305, 381 and 341 to ground (+).

When relay 390 operates to its second step, contacts 392 and 393 operate, thereby transferring the control circuit for the counting relays to control relay 300. Contacts 394 and 395 operate, thus transferring the control circuit of relay 330 from the tens to the units scanner switch brush. After capacitor C31 discharges sufficiently and relay 325 releases, control relay 330 operates over its upper winding when the circuit through its lower winding is broken at contacts 395, thereby terminating the differential energization.

Responsive to the operation of relay 330, contacts 331 close for completing a circuit to operate fourth counting relay 300 to its first step, the circuit being traced as follows: ground (+), contacts 331, 353, 371, 392, 302 and the lower winding of relay 300 to (−) battery. Relay 300 operates its "X" contacts 303 and 305 only, whereupon the upper winding of relay 300 is shunted over a circuit which may be traced from ground (+) through contacts 331, 353, 371, 392, 302, the upper winding of relay 300, contacts 303, 381, and 341 to ground (+).

Also responsive to operation of control relay 330, contacts 432a open to break the shunt around pulsing contacts 412. Contacts 334 close but capacitor C31 is not charged because contacts 305 are now open. Contacts 333 have no effect at this time. Contacts 431a close, thus connecting pulse relay 410 to the pulse source.

Responsive to the first pulse that is received from the pulse source, relay 410 opens and closes contact 412 to transmit a digit pulse whereupon test connection 107 is driven one step into its bank of terminals. Simultaneously therewith, relay 410 closes contact 411 to operate scanner stepping magnet SM45 to drive brush SC41 one step. On the first step, the scanner switch finds a ground (+) marking and completes a circuit including the first terminal in the associated bank, brush SC41, contacts 394, 327 and the lower winding of control relay 330 to (−) battery. Relay 330 is differentially energized, releases and remains released until the scanner releases, as explained below.

Responsive to release of relay 330, contacts 431a open to disconnect pulse relay 410 from the pulse source. Contacts 432a close for shunting pulsing contacts 412. Contacts 335 close but relay 325 does not operate since capacitor C31 is not charged. Contacts 333 close; however, scanner release magnet R35 is not energized since contacts 328 and 305 are now open. Contacts 331 open, thus breaking the shunt around the upper winding of the counting relay 300 to cause it to operate over a circuit which may be traced from (−) battery through the lower and upper windings of relay 300, contacts 303, 381 and 341 to ground (+).

Responsive to the operation of relay 300 to its second step, contacts 304 close, thereby transmitting a start signal to test circuit TC41 for causing the first subscriber line to be tested. As pointed out above, control relay 330 remains energized over a circuit extending from ground (+) through the first terminals associated with brush SC41, contacts 394 and 327 to (−) battery via the lower winding of relay 330.

*Testing.*—Test circuit TC41 may be any means adapted to conduct suitable tests on subscriber lines. For a specific example of such a test circuit, see a copending application Serial No. 743,783, filed June 23, 1958, by David T. Robb and assigned to the assignee of the subject case.

Figure 1:
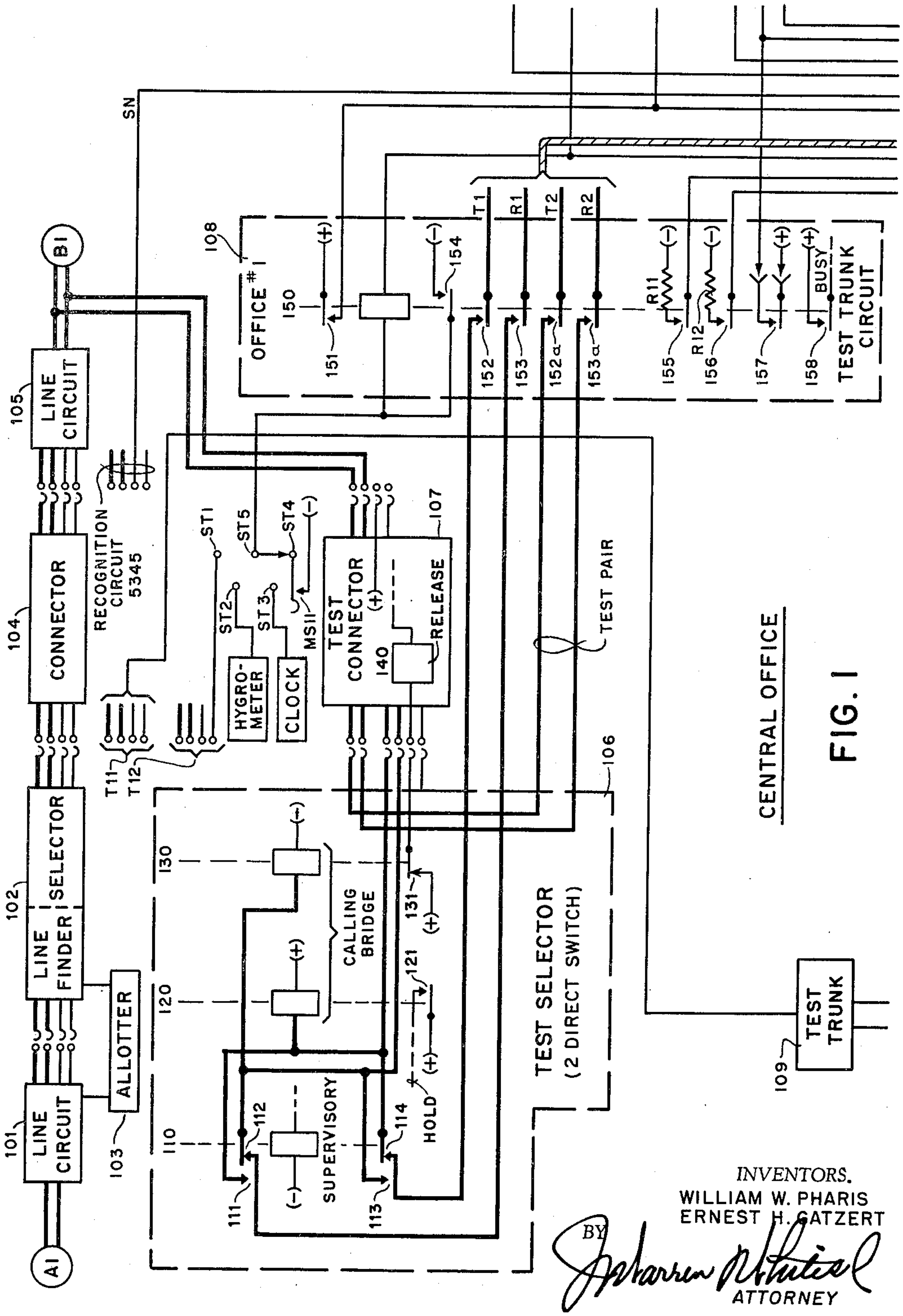

Briefly, in résumé, it is seen that the routining test cycle was initiated by the operation of manual switch MC11 (FIG. 1). Responsive thereto, the scanner was operated to scan the thousands, hundreds, tens, and units registers in sequence. Responsive to each scanning, a single digit pulse was transmitted, thereby operating test selector 106 one step in its primary direction responsive to the thousands digit, and one step in its secondary direction responsive to the hundreds digit. Test connector 107 was operated one step in its primary direction responsive to the tens digit and one step in its secondary direction responsive to the units digit. Responsive thereto, the test circuit is connected to the first subscriber line to be tested (i.e., the line having directory number 1111) over the heavily inked conductors T2 and R2. A suitable triggering signal is transmitted to test circuit TC41 from contacts 304, and a line is tested.

The two pairs of heavily inked conductors (T1, R1, T2 and R2) which are shown in the drawings are switched simultaneously by any suitable means. For example, two switches may be stepped simultaneously, each of which is individually connected to one of the pairs. One pair (conductors T1 and R1) is used to control the switch train as it is stepped from line to line during testing. The other pair (conductors T2 and R2) is the test pair which is actually connected to subscriber lines during testing. The test pair is arranged to have a minimum number of contacts, brushes, etc. which tend to create conditions that may incorrectly cause subscriber lines to appear faulty. Also, test connector 107 is arranged to operate the cut-off relay by any suitable means (not shown) in each line circuit, thereby clearing the line of attachments.

If a fault is indicated, suitable signals are transmitted from test circuit TC41 over conductors F1–F4 to printer PR42. The reference numerals F1–F4 indicate similarly marked conductors in the afore-mentioned Robb application. A testing cycle is completed and a printed record is made if a fault is found. Next, test circuit TC41 transmits a signal to operate the units stepping magnet SM44.

Responsive to operation of magnet SM44, the units stepping register operates once, thereby driving brushes RG41 and RG45 one step into their associated banks of contacts. The units register is operated so that the directory numbers of faulty lines may be determined and so that the operation of the switch train may be checked as explained later. Also responsive to the operation of the units register stepping magnet SM44, contacts SM44a close to operate interlock relay 420 over an obvious circuit. The scanner switch is not operated, thus relay 330 remains differentially energized over the circuit including brush SC41 and the first terminal of the associated bank.

Responsive to operation of interlock relay 420, contacts 421 open to cause test connector 107 to take one step further into the bank of contacts on which its brushes are resting. Since it is assumed that the first subscriber line in the office has been tested, it may now be assumed that test connector 107 is connected to the second subscriber line (i.e., the line having directory number 1112).

When units stepping magnet SM44 releases responsive to signals transmitted by test circuit TC41, contacts SM44a open, thereby releasing interlock relay 420. Responsive to release of relay 420, contacts 422 close to extend ground (+) over the circuit including contacts 422, 447, 463 and 483 to test circuit TC41 which replies by testing the line that has just been seized by test connector 107.

After the second line has been tested, test circuit TC41 reoperates unit stepping magnet SM44 and in turn test connector 107, as explained above. In this manner, register switch brushes RG41 and RG45 are advanced step-by-step over their associated banks of terminals.

*Units release.*—After ten lines have been tested, brush RG41 encounters the eleventh terminal in its associated bank of contacts, thereby operating units release relay 340 over a circuit which may be traced from ground (+) through brush RG41 and the winding of units release relay 340 to (−) battery.

Responsive to the operation of units release relay 340, contacts 341 open, thereby releasing counting relay 390 which had been holding over a circuit including (−) battery, both windings of relay 390, contacts 391, contacts 381 and 341 to ground (+). Also, relay 300 releases when the circuit including contacts 303, 381 and 341 is broken at contacts 341. Contacts 342 close to complete an obvious circuit for operating units release magnet R31, whereupon the units register brushes RG41 and RG45 return to their normal positions in connection with terminals 1 of their respective banks of contacts. Contacts 343 close to release the scanner by operating magnet R35 over an obvious circuit. Contacts 442 close and magnet SM41 operates to advance the tens register brushes RG42 and RG46 to the second terminals in the associated banks. Contacts 443 and 445 close while contacts 444 and 446 open, thereby disconnecting the heavily inked talking conductors from test circuit TC41 and connecting them to resistance battery over the circuits which may be traced from (−) battery through resistors R11 and R12 (in parallel), contacts 155 and 156 (in parallel), contacts 443 and 445 (in parallel), contacts 421 and 412, contacts 152 and 153 (in parallel), and contacts 112 and 114 (in parallel) to calling bridge relay 120 which is held operated, and to calling bridge relay 130 which is shunted and releases.

Responsive to the release of calling bridge relay 130, contacts 131 close to release test connector 107 which is assumed to be in the second rank of the test switch train by operating release magnet 140. Responsive to continued operation of relay 120, contacts 121 remain closed for holding test selector 106 which is assumed to be in the first rank of the test switch train.

At this point, it may be well to note that application of battery to both conductors T1 and R1 and the use of two calling bridge relays 120 and 130 neutralize the effects of any supervisory relays, such as relay 110, which may or may not have reversed the direction of battery flow over the heavily inked talking conductor. It might also be noted that units release relay 340 is held operated over any suitable circuit (not shown) including conductor H1 during release of the units register. For example, conductor H1 and associated circuit may include units register switch off-normal contacts or contacts controlled by the units release magnet R31. After the register releases, the off-normal contacts or the contacts controlled by magnet R31 open and units release relay 340 releases. Conductors H2 and H3 serve a similar purpose for tens release relay 360 and hundreds release relay 380.

Units release relay 340 restores responsive to the release of the units register, as explained above. Contacts 341 close to prepare a holding circuit for the counting relays 390 and 300. Contacts 342 and 343 open to break the circuit to the release magnets. Contacts 442 open to terminate the signal which caused the tens register brush RG42 to take one step. Contacts 443–446 restore, thereby reconnecting the heavily inked talking conductors to test switches 106 and 107. Contacts 447 are part of an interlock circuit which opens when units release relay 340 operates so that test circuit TC41 will not initiate a test while the test switch train is being operated. Contacts 447 close responsive to the release of units release relay 340; however, contacts 304 have already opened responsive to the release of fourth counting relay 300. Therefore, test circuit TC41 does not resume testing at this time.

Differential control relay 330 was differentially energized and therefore released throughout the testing of the first ten lines since the lower winding had been energized over a circuit which may be traced from (—) battery through the lower winding of relay 330, contacts 327, 394 and brush SC41 to ground (+) on the first terminals. Responsive to release of scanner brush SC41 and release of contacts 394, the circuit through the lower winding of differential control relay 330 is broken, thus causing it to reoperate over its upper winding.

It might be well to recall that counting relays 350 and 370 are locked operated over a circuit which may be traced through the windings of the two relays, contacts 351 and 373 respectively, contacts 361 and 157 to ground (+).

Responsive to the reoperation of differential control 330, contacts 331 close, thus completing a circuit which may be traced from ground (+) through contacts 331, 353, 371 and 393 to the upper winding of relay 390 and (—) battery. When energized in this manner, relay 390 operates its "X" contacts 391. The lower winding of relay 390 is shunted by a circuit which may be traced from ground (+) at contacts 331 through contacts 353, 371, 393, the lower winding of relay 390, contacts 391, 381 and 341 to ground (+).

Also responsive to the operation of relay 330, contacts 431*a* close, thereby connecting any suitable pulse source to relay 410. Contacts 432*a* open to break a shunt around pulsing contacts 412 and contacts 334 close to charge capacitor C31.

Relay 410 is operated and released responsive to the first pulse to be transmitted from the pulse source. Contacts 411 close to operate magnet SM45 for driving scanner switch brush SC42 one step. Contacts 412 open and close for transmitting a digit pulse to operate test connector 107 one step in its primary direction.

The next pulse delivered by the pulse source causes relay 410 to operate contacts 411 and drive scanner switch brush SC42 a second step while opening contacts 412 to drive test connector 107 a second step in its primary direction. When scanner brush SC42 encounters its second set of terminals, it finds a ground (+) marking which is extended through register brush RG42, whereupon a circuit is completed for differentially energizing and thus releasing control relay 330 as follows: ground (+), brush RG42, the second terminal in the tens register bank, scanner brush SC42, operated contacts 374, released contacts 395, 327 and the lower winding of differential control relay 330 to (—) battery.

Relay 330 restores and closes contacts 432*a* thereby shunting pulsing contact 412. Contacts 431*a* open to disconnect pulse relay 410 from the pulse source. Contacts 335 close and relay 325 operates while capacitor C31 discharges. Contacts 333 close to operate scanner release magnet R35 over a circuit extending from (—) battery through the winding of magnet R35, contacts 333, 328, 305, 381 and 341 to ground (+). Contacts 331 open, thereby breaking the shunt circuit which had been keeping relay 390 on its first step. Relay 390 now operates to its second step over the circuit which may be traced from (—) battery through the upper and lower windings of relay 390, contacts 391, 381 and 341 to ground (+).

When energized via both windings, relay 390 is adapted to operate all of its contacts. When contacts 392 close, a control circuit is extended to fourth counting relay 300; however, nothing happens at this time since contacts 331 are open. When contacts 395 open, the lower winding of differential control relay 330 is de-energized.

Relay 330 operates over its upper winding and closes contacts 331 to operate fourth counting relay 300 to its first step, the circuit being as follows: ground (+), contacts 331, 353, 371, 392, 302 and the lower winding of relay 300 to (—) battery. When energized over one winding only, relay 300 is adapted to operate only its "X" or preliminary contacts 303 and 305 whereupon a shunt is completed through the upper winding of relay 300 as follows: ground (+), contacts 331, 353, 371, 392, 302, the upper winding of relay 300, contacts 303, 381 and 341 to ground (+).

Also responsive to the operation of differential control relay 330, contacts 432*a* open so that pulsing contacts 412 may be effective. Contacts 431*a* close, thus connecting the pulse source to control pulse relay 410. Contacts 334 close but there is no effect since contacts 305 are open, i.e., capacitor C31 is not charged.

Responsive to the first pulse that is received, contacts 411 close to operate scanner stepping magnet SM45, thereby driving brush SC41 one step where it encounters a permanent ground (+) marking. Contacts 412 open and close thereby transmitting a single digit pulse to drive test connector 107 one step in its secondary direction.

When scanner switch SC41 encounters the ground (+) marking, a circuit is completed through contacts 394 and 327 for energizing the lower winding of relay 330. Since relay 330 is now differentially energized, it releases, thereby closing contacts 432*a* to shunt pulsing contacts 412. Contacts 431*a* open to disconnect pulse relay 410 from the pulse source. Contacts 335 close; however, since capacitor C31 is not charged, relay 325 does not operate and the scanner is not released. Contacts 331 open to break the shunt around the upper winding of fourth counting relay 300, thus allowing it to operate to its second step over a circuit which extends from (—) battery through the lower and upper windings of relay 330, contacts 303, 381 and 341 to ground (+). When energized in this manner, relay 300 operates all of its contacts.

When relay 300 operates to its second step, contacts 302 open to break the circuit over which fourth counting relay 300 was originally operated; however, it remains locked over its contacts 303. Contacts 304 close, thereby extending a start signal to test circuit TC41 which responds by testing the line just seized by test circuit 107.

*Tens release.*—The circuit operates in the manner described above until test connector 107 has been stepped across all ten of its terminals in its second bank. Thereafter, brush RG41 contacts the eleventh terminal in its associated bank to operate the units release relay and repeat the procedures described above in the section entitled "Units Release."

The above-described sequence of operations continues while a hundred subscriber lines are being tested. On the step indicating the hundred and first line, tens register stepping magnet SM41 drives brush RG42 to the eleventh terminal, whereupon tens release relay 360 is operated over an obvious circuit.

Responsive to operation of relay 360, contacts 361 open the circuit over which the first two counting relays 350 and 370 have been held operated from ground (+) applied through contacts 157. At this time, all counting relays are released, contacts 341 having opened responsive to operation of units release relay 340, as explained above. Also responsive to the operation of tens release relay 360, contacts 364 close to release the scanner switch and contacts 362 and 363 close to release the tens and units register switches. Conductor H2 is part of a circuit that is not shown in detail which is used to hold relay 360 while the tens register releases. For example, the circuit may include contacts that are controlled by the tens release magnet. Contacts 462 close, thereby operating the hundreds register magnet SM42 to drive brushes RG43 and RG47 to the second step in their associated banks of contacts. The circuit is now in the condition that it was in when seized except that the hundreds register is on its second terminal instead of its first terminal and further except that test selector 106 in the first rank of the test switch train is stepped to seize a different test connector in the second rank of the test switch train.

*Hundreds release.*—After the second hundreds group of lines has been tested, hundreds register stepping magnet SM42 is operated to drive brushes RG43 and RG47 to the third terminal in their associated banks, the process being repeated until a thousand lines are tested. After one thousand lines have been tested, magnet SM42 is operated to drive brush RG43 to the eleventh terminal of its associated bank, thereby operating hundreds release relay 380 over an obvious circuit. Responsive thereto, contacts 481 close. If it were desirable to terminate testing after a thousand lines have been tested, as for example in the remote office of FIG. 2, a circuit would now be completed from ground (+) through contacts 257, 481, and the winding of routine finish relay 310 to (−) battery which would operate to terminate testing, as explained below. However, it is assumed that the central office of FIG. 1 which is being tested has more than a thousand lines.

Responsive to the operation of relay 380, contacts 381 open, thereby breaking a locking circuit to release counting relays 390 and 300. Contacts 385 close to operate release magnet R35 for releasing the scanner while contacts 382, 383 and 384 close to operate release magnets R31–R33 and thus release the units, tens and hundreds registers. Conductor H3 is part of a circuit (not shown) which holds relay 380 while the hundreds register releases. Contacts 482 close, thus operating thousands register stepping magnet SM43 for driving brushes RG44 and RG48 a step further into their associated bank of terminals. Contacts 483 are controlled by hundreds release relay 380 for breaking the interlock circuit to prevent test circuit TC41 from conducting a test prematurely. By the time that hundreds release relay 380 restores, contacts 304 on the fourth counting relay 300 will have opened to assume control of test circuit TC41.

The circuit now operates in the manner described above except that the thousands register has been advanced one step so that the next thousands group of subscriber lines is tested.

*Test finished.*—After ten thousand lines have been tested, brush RG44 is driven to its eleventh step whereupon an obvious circuit is completed for operating routine finish relay 310.

Responsive to the operation of relay 310, contacts 311 open to restore office #1 relay 150 and test start relay 320. Contacts 312–316 close to operate release magnets for all switches. Since many details have been omitted in the interest of greater clarity, it is noted that contacts 311 provide master ground (now removed) so that all circuit items which have not been shown are returned to normal at this time.

*Checking the Test Train*

As explained above, test selector 106 and test connector 107 are adapted to be stepped one step at a time under control of the various relays of FIGS. 3 and 4. It is desirable for the test train to be connected to the line indicated by the position of the register at the time that test circuit TC41 completes its test or the printer PR42 may regiser a false indication. Therefore, a recognition circuit 5345 (FIG. 1) is arranged to be seized by test connector 107 at a time when directory number 5345 is registered in register bank #2 (FIG. 4). If so, a suitable record is made by printer PR42.

In greater detail, brushes in register bank #2 (FIG. 4) are stepped in synchronism with brushes in register bank #1. Therefore, at a particular time during the test routine, brush RG48 is standing on terminal 5 of the thousands register, brush RG47 is standing on terminal 4 of the hundreds register, brush RG46 is standing on terminal 3 of the tens register and brush RG45 is standing on terminal 5 of the units register. When test circuit TC41 marks conductor TC, a circuit is completed through register bank #2 for operating check relay 430.

Responsive to operation of relay 430, contacts 431 close, thereby connecting sleeve relay 440 to conductor SN. If a ground marking is applied by the test connector 107 at this time, relay 440 operates, contacts 441a close and an indication is transmitted over conductor PT1 to printer PR42 and a record is made that the recognition circuit has been properly encountered. Thus, a coincidence of markings in register bank #2 and of seizure of recognition circuit 5345 is an indication that the test train has been stepped accurately.

If recognition circuit 5345 is reached by the test switch train at a time when the register indicates some other number, contacts 432 are closed, the circuit appears busy, relay 440 never operates, contacts 441a do not close and no record is printed.

Obviously, the situation may be reversed whereby a record is made when the test train is not stepped accurately.

Still other plans will suggest themselves to those skilled in the art. For example, the circuit may be arranged for printer PR42 to record the number stored in the register each time that a recognition circuit is found. Also, known marginal faults may be wired into the recognition circuit to check test circuit TC41.

*Testing Remote Office*

Figures 2, 5:
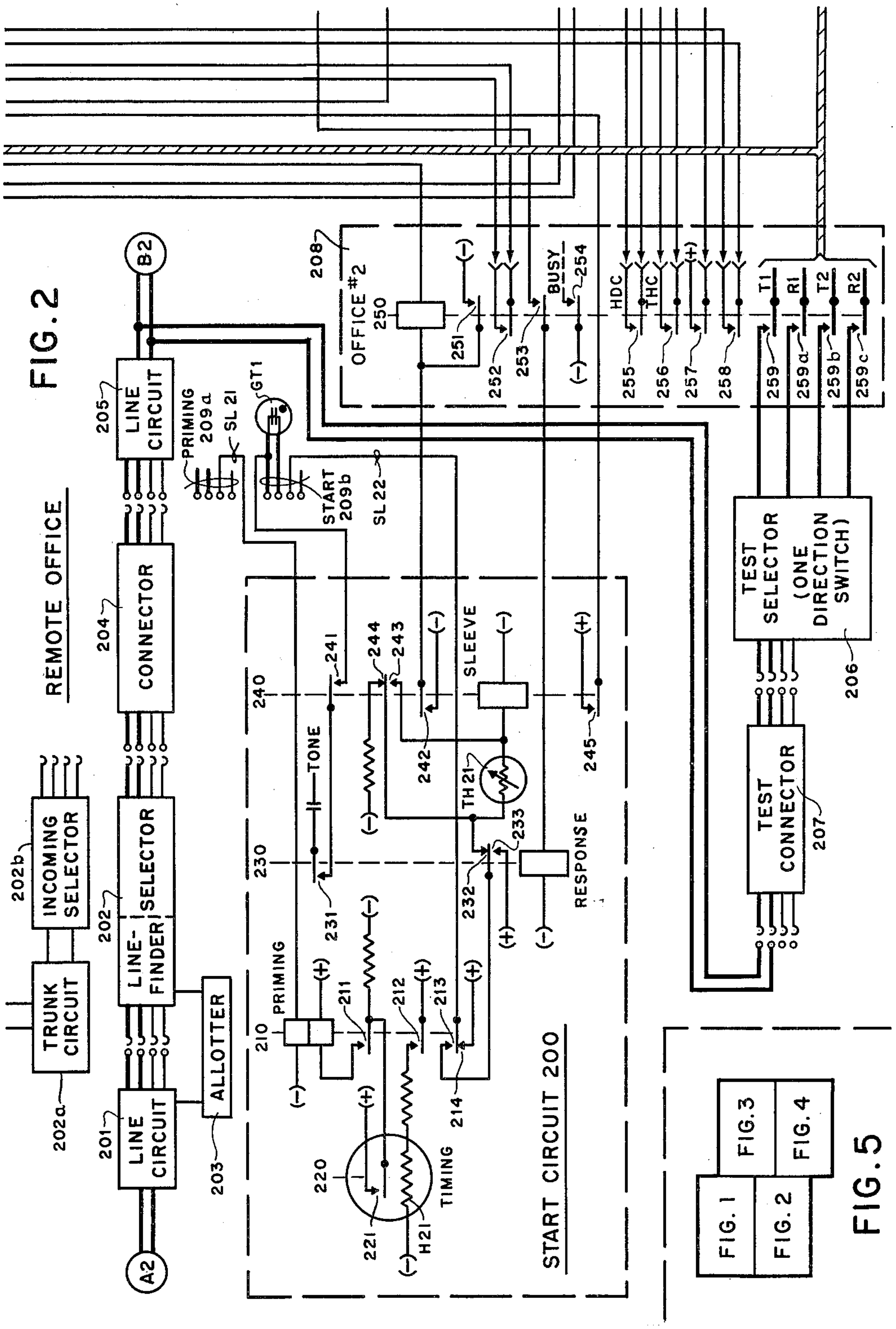

FIG. 2 differs from FIG. 1 in that FIG. 2 has a three digit test switch train, means for skipping certain numbers, and means for starting the routiner remotely.

*Remote Control Starting*

Since certain periods, such as between midnight and 8 a.m. may have low call density, it is desirable to start routine testing at times when persons charged with line maintenance may be away from the telephone office. Therefore, it is desirable to provide means whereby a maintenance person may start the routiner from any phone in a telephone system without regard to geographical location of such phone. For example, a maintenance man may wish to start a routiner from his bedside, from a friend's house or from a pay station in a public or semipublic building.

For the purposes of this description, it is assumed that the routiner is to be started from subscriber station A1 in FIG. 1 and further, it is assumed that lines in the remote office of FIG. 2 are to be tested. The maintenance man first dials the digits which are necessary to complete a connection from line circuit 101 through line finder-selector 102, terminals T11, trunk circuit 109, trunk circuit 202*a*, incoming selector 202*b*, and connector 204 to priming terminals 209*a*. Connector 204 is adapted to apply a ground (+) potential to sleeve conductor SL21, as by the usual busy marking, for example. Responsive thereto, an obvious circuit is completed for operating priming relay 210 through its upper winding.

Responsive to the operation of priming relay 210, contacts 211 close to complete a locking circuit to (−) battery. Contacts 212 close, thereby connecting a potential through heater element H21. Contacts 213 close to connect sleeve relay 240 to be controlled from start terminal 209*b*. Contacts 214 open to remove a busy marking which normally guards start terminals 209*b* against seizure by an unauthorized call.

The characteristics of timing element 220 are such that after a predetermined time interval such as two minutes, for example, heater H21 has generated enough heat to close contacts 221, thereby shunting priming relay 210 and causing it to release. Thereafter, busy marking extended through contacts 214, prevents seizure via point of access 209*a*.

For the purposes of this description, it is assumed that the person at telephone station A1 restores the receiver and makes a new call within the two minute period required for contacts 221 to close. This time he dials the directory number of start terminals 209*b*. Connector 204 seizes terminals 209*b* whereupon gas tube GT1 fires to trip ringing current. A circuit is completed for operating relay 240 via sleeve conductor SL22, contacts 213, 232, thermistor TH21, and the winding of sleeve relay 240 to (−) battery. Thermistor TH21 is provided to delay the operation of sleeve relay 240 in order that it will not operate responsive to connectors stepping over but not stopping on terminals 209*b*. Thereafter, sleeve relay 240 closes contacts 243, thereby shunting thermistor TH21 to allow a maximum time for cooling. Contacts 244 open to remove the idle line battery marking which made it possible for connector 204 to seize terminals 209*b*, it being understood that connector 204 is a battery searching device. If a different type of connection is used, contacts 244 may be adapted to remove another type of idle line marking. Contacts 245 close to extend a ground (+) marking over an obvious circuit to operate test start relay 320 which locks to master ground at contacts 322 and 311. Contacts 242 close for operating office #2 relay 250 over a circuit including contacts 311.

Responsive to the operation of test start relay 320, contacts 324 close, thereby extending a ground (+) marking over a circuit including contacts 324, 253 and the windings of response relay 230 to (−) battery.

Relay 230 operates contacts 231 and since sleeve relay 240 has already closed contacts 241, a tone is transmitted to the person at telephone station A1.

Upon hearing the tone, the person knows that the routiner has started; therefore, the receiver is replaced at station A1, thus releasing all switching equipment leading to and including start circuit 200.

The common control circuit of FIGS. 3 and 4 proceeds to operate in the manner described above except for operational modifications as determined by the operation of office #2 relay 250. In greater detail, contacts 254 close to mark the control equipment as busy in any suitable manner. Contacts 251 close to lock office #2 relay 250 in an operated condition. Contacts 259–259*c* close to interconnect the heavily inked talking conductors extending between test selector 206 and the common circuit of FIGS. 3 and 4.

Contacts 252 and 255–258 will be described below. It will be obvious to those skilled in the art that inclusion of all of these contacts is inconsistent. For example, contacts 257 eliminate all testing under control of the thousands register while contacts 256 eliminate only testing in some groups under control of the thousands register. The arrows adjacent contacts 252 and 255–258 indicate that the wirings are optional. It is assumed that those skilled in the art will connect the appropriate wirings as required and therefore all options may be explained despite the inconsistencies.

When test start relay 320 operates responsive to closure of contacts 245, contacts 321 close to complete a circuit which extends from ground (+) on contacts 341 through contacts 321, 252, and the lower and upper windings of relay 350 to (−) battery. Responsive thereto, the first counting relay 350 operates to its second step immediately, thereby opening contacts 355 and closing contacts 354 to cancel control from the thousands register when the test switch train is initially stepped on seizure. In this manner, the first digit pulse train that is transmitted into test selector 206 is under the control of a circuit extending from ground (+) through register switch brush RG43, scanner brush SC43, operated contacts 354, etc. Otherwise, the circuit operates on seizure as described above.

Contacts 257 close when office #2 relay 250 operates to prepare a circuit which is effective for operating routine finish relay 310 when hundreds release relay 380 operates contacts 481 after transmission of all hundreds, tens and units digits, thus eliminating the fourth digit for the three digit controlled test switch train of the Remote Office (FIG. 2).

The net effect of contacts 252 and 257 is that the common control circuit of FIGS. 3 and 4 is converted to provide three digit control of the test switch train in lieu of the normal four digit control.

Another distinction between the test switch train of the Remote Office (FIG. 2) and that of the Central Office (FIG. 1) is that it is undesirable to hold test selector 206 in an operated condition while test connector 207 releases during testing, i.e., switches in both ranks of the switch train are released in FIG. 2. Therefore, contacts 258 are provided in lieu of contacts 157 of FIG. 1. That is, in the case of calls through the Central Office, counting relays 350 and 370 are held operated until tens release relay 360 operates to open the holding circuit at contacts 361. In the case of calls through the Remote Office, the first two counting relays 350 and 370 are held via a circuit from ground (+) through contacts 341, 381, 258 and 361. Each time that ten lines have been tested and brush RG41 is directed to its eleventh terminal, units release relay 340 operates to open contacts 341 and thereby release counting relays 350 and 370. Thereafter, an entire train of digit pulses is transmitted to drive test selector 206 and test connector 207 as when the circuits were originally seized. Of course, any markings that eliminate the thousands digits continue to be effective for the duration of the routining.

Still another condition which may be encountered during routining is where there is need to skip over certain digit indications that may be registered. For the purposes of this description, it is assumed that there is no subscriber line in the Remote Office (FIG. 2) which has a directory number that should be tested responsive to an indication in the hundreds register of the numeral 8. Therefore, contacts 255 are provided to skip the transmission of such hundreds digit during testing.

In greater detail, the register is advanced as described above until brush RG43 encounters the eighth set of terminals whereupon ground (+) potential is transmitted over a circuit including brush RG43, the eighth terminal in the bank of contacts, contacts 255, and through the winding of tens release relay 360 to (—) battery. The effect is the same as if the entire groups of lines indicated by the eighth terminal in the hundreds bank had already been tested. Tens release relay 360 operates and closes contacts 462, thereby stepping brush RG43 onto the ninth terminal at which time normal testing is resumed.

A thousands group may be skipped in a similar manner. For example, it may be assumed that no subscriber line should be tested in the Remote Office when the thousands register is on its fourth step. Therefore, when brush RG44 is stepped to its fourth terminal, a circuit is completed from ground (+) through brush RG44, fourth terminal, contacts 256, and the winding of hundreds release relay 380 to (—) battery. Contacts 482 close, thousands register stepping magnet SM43 operates and the thousands brush RG44 is advanced to connect with the fifth terminal.

Obviously, the eighth terminal in the hundreds register and the fourth terminal in the thousands register were selected above as an illustration only. Any terminals in the register may be marked in a similar manner.

The register-sender of FIG. 4 provides two types of markings. One type of marking is illustrated in "Bank #1," (i.e. conductors HDC and THC) wherein individual contacts are marked for a certain function each time that an individual set of terminals is encountered. For example, as shown in FIG. 4, the hundreds digit "8" is skipped each time that brush RG43 encounters the eighth terminal when contacts 255 are closed. The other type of marking is a joint action wherein several registers must coincide before a certain function is performed. For example, in Bank #2" all four brushes must be standing on the proper contacts before relay 430 operates. Obviously, the possible combinations are limited only by the amount of equipment that is furnished.

As an example of an arrangement that may be made, consider mixed terminal per line and terminal per station service. In terminal per line, a directory number identifies a subscriber line that may serve many subscribers and an extra digit identifies a particular code or frequency that signals the called subscriber, as distinguished from other subscribers on the same line. If the code selection digits are arranged always to follow the digit 800, for example, it may be desirable to cancel all digits between 800 and 899. If so, conductor HDC is used, as shown (FIG. 2). In another example, perhaps only the 800 digits in a particular thousands group, such as 2000, should be canceled, whereupon it is only necessary to provide a third bank wired similar to "Bank #2," i.e., a circuit would extend from ground (+) through a brush and second contact in the third bank thousands register, a brush and eighth contact in the third bank hundreds register, an office relay contact similar to contacts 255 and then to the winding of tens release relay 360 to (—) battery, whereupon digits 2800 through 2899 are canceled.

Next consider terminal per station service where digits representing a director number directs equipment not only to seize a line but also to select a ringing current. If there are four subscribers on a line, there are four distinct directory numbers which may seize the same line. Hence, the same line may be tested four times if no means is provided for passing over the line on three of its appearances. Here again the markings in the register bank may be adapted to skip transmission of certain digits so that lines will be passed over, as required.

There may be any number of other reasons why a routiner should skip certain numbers. For example, certain lines may be unused, there may be dead levels, etc. which represent lines that should not be tested. Therefore, the foregoing examples are used by way of illustration only. The point is, that any selected digit or digits may be passed over in the register. Therefore, when reference is made to dead levels, unused equipment, mixed service, etc., it is by way of illustration and not of limitation. Moreover, the mere fact that two register banks are shown in the drawings and three are discussed in the foregoing description does not limit the register to these particular arrangements. It is thought that those skilled in the art may adapt the two types of markings exemplified by "Bank #1" and "Bank #2" to fulfill any basic needs.

*Miscellaneous*

While specific embodiments of the invention have been shown and described, other modifications may readily occur to those skilled in the art. Therefore, the invention is not to be limited to the specific arrangement shown and described, and the appended claims are intended to cover all modifications which fall within the true spirit and scope of the invention.

What is claimed is:

1. In a telephone system, a line testing routiner, a signal source, common control means responsive to signals from said signal source for individually connecting said routiner with a selected one of a plurality of offices, each of said offices having a recognition terminal, a plurality of subscriber terminals, individual directory numbers for each of said terminals, switching means responsive to signals from said signal source for sequentially connecting said routiner to individual ones of said terminals, register means responsive to signals from said signal source for registering informaiton indicative of the particular terminal to which said routiner should be connected, and means responsive to said register means having reigstered therein the directory number of said recognition terminal to determine whether said recognition terminal is connected to said routiner.

2. In a telephone system, a line testing routiner, a starting circuit for said line routiner having first and second points of access, said starting circuit including busy marking means for normally placing a busy signal on said second point of access, automatic switching equipment for completing connections through said telephone system in response to the transmission of directory number indications, said automatic switching equipment including means for seizing said starting circuit over said first point of access in response to the transmission of first particular directory number indications, said starting circuit including timing means coupled to said busy marking means for removing said busy marking signal from said second point of access for a predetermined period of time in response to seizure of said starting circuit over said first point of access, said automatic switching equipment including means for seizing said starting circuit over said second point of access in response to the transmission of second particular directory number indications only when said busy marking signal is removed therefrom, said starting circuit including start signal means coupled to said routiner for starting said routiner in response to the seizure of said starting circuit over said second point of access, and said starting circuit further including response means coupled to said routiner for returning a tone over said second point of access and said switching equipment in response to said routiner having been started.

3. In a telephone system, a line testing routiner, a signal source, a plurality of subscriber terminals, a recognition terminal included among said subscriber terminals, individual directory numbers for each of said subscriber terminals and said recognition terminal, switching means for sequentially connecting said routiner to individual ones of said subscriber terminals and said recognition terminal responsive to signals from said signal source, register means responsive to signals from said signal source for registering information indicative of the terminal to which said routiner should be connected, and means responsive to said register means having registered therein the directory number corresponding to the directory number of said recognition terminal for testing to determine whether said recognition terminal is connected to said routiner.

4. In a telephone system, a plurality of subscriber terminals having individual telephone directory numbers, a signal responsive register for sequentially registering therein information indicative of the individual telephone directory number of any one of said subscriber terminals, means responsive to the registration of a directory number corresponding to a subscriber terminal in said register for transmitting directory number signals representative thereof, switching means responsive to said transmitted directory number signals for completing a connection to the subscriber terminal represented by the recorded number, means responsive to said register being advanced by said signals to a registration indicative of a predetermined directory number for completing a test circuit over said switching means to the subscriber terminal corresponding to the predetermined directory number, and means for determining whether the connection is completed to the subscriber terminal corresponding to the predetermined directory number.

5. In a telephone system, a normally dormant auxiliary function circuit, a starting circuit for said dormant circuit having first and second points of access, said starting circuit including busy marking means for normally placing a busy signal on said second point of access, automatic switching equipment for completing connections through said telephone system in response to the transmission of directory number indications, said automatic switching equipment including means for seizing said starting circuit over said first point of access in response to the transmission of first particular directory number indications, said starting circuit including timing means coupled to said busy marking means for removing said busy marking signal from said second point of access for a predetermined period of time in response to seizure of said starting circuit over said first point of access, and said automatic switching equipment including means for seizing said starting circuit over said second point of access in response to the transmission of second particular directory number indications only when said busy marking signal is removed therefrom.

6. In a telephone system, a normally dormant auxiliary function circuit, a starting circuit for said dormant circuit having first and second points of access, said starting circuit including busy marking means for normally placing a busy signal on said second point of access, automatic switching equipment for completing connections through said telephone system in response to the transmission of directory number indications, said automatic switching equipment including means for seizing said starting circuit over said first point of access in response to the transmission of first particular directory number indications, said starting circuit including timing means coupled to said busy marking means for removing said busy marking signal from said second point of access for a predetermined period of time in response to seizure of said starting circuit over said first point of access, said automatic switching equipment including means for seizing said starting circuit over said second point of access in response to the transmission of second particular directory number indications only when said busy marking signal is removed therefrom, and said starting circuit including start signal means coupled to said dormant circuit for starting said dormant circuit in response to the seizure of said starting circuit over said second point of access.

7. In a telephone system, a normally dormant auxiliary function circuit, a starting circuit for said dormant circuit having first and second points of access, said starting circuit including busy marking means for normally placing a busy signal on said second point of access, automatic switching equipment for completing connections through said telephone system in response to the transmission of directory number indications, said automatic switching equipment including means for seizing said starting circuit over said first point of access in response to the transmission of first particular directory number indications, said starting circuit including timing means coupled to said busy marking means for removing said busy marking signal from said second point of access for a predetermined period of time in response to seizure of said starting circuit over said first point of access, said automatic switching equipment including means for seizing said starting circuit over said second point of access in response to the transmission of second particular directory number indications only when said busy marking signal is removed therefrom, said starting circuit including start signal means coupled to said dormant circuit for starting said dormant circuit in response to the seizure of said starting circuit over said second point of access, and said starting circuit further including response means coupled to said dormant circuit for returning a tone over said second point of access and said switching equipment in response to said dormant circuit having been started.

8. In a telephone system, a subscriber line testing routiner, means having two points of access for starting said routiner, one of said points of access comprising a priming circuit and the other of said points of access comprising a starting circuit, automatic switching equipment for completing telephone calls through said telephone system responsive to the transmission of directory number indications, means responsive to particular directory number indications for directing said automatic switching equipment to seize said priming circuit, means responsive to said seizure of said priming circuit for measuring a predetermined time interval, means responsive to other directory number indications for directing said automatic switching equipment to seize said starting circuit, and means responsive to seizure of said starting circuit during said predetermined time interval for starting said routiner.

9. The telephone system of claim 8, and means for returning a tone over said automatic switching equipment as an indication that said routiner has started.

10. The telephone system of claim 9, and recognition means accessible to said automatic switching equipment and identified by at least one of said directory number indications, said routiner comprising register means marked to identify said directory numbers, connecting means responsive to said register means for connecting subscriber lines to line testing means, and means for testing to determine whether said connecting means is coupled to said recognition means when said register means indicates said one directory number.

11. The telephone system of claim 8, and means for normally marking said starting circuit as busy, and means for removing said busy marking during said predetermined time interval, whereby said other directory number indications must be dialed during said predetermined time interval in order to start said routiner.

12. A telephone system comprising a plurality of offices each serving a plurality of subscriber lines, line routiner means common to said offices comprising testing means for testing said subscriber lines and control means for controlling seizure of said subscriber lines, connecting means in each of said offices operative responsive to said control means for individually connecting said subscriber lines served by that office to said testing means, said connecting means in some of said offices being controlled by a particular number of digit pulse trains, said connecting means in other of said offices being controlled by a different number of digit pulse trains, means having two points of access for starting said routiner, one of said points of access comprising a priming circuit and the other of said points of access comprising a starting circuit, automatic switching equipment for completing telephone calls through said telephone system responsive to the transmission of directory number indications, means responsive to particular directory number indications for directing said automatic switching equipment to seize said priming circuit, means responsive to said seizure of said priming circuit for measuring a predetermined time interval, means responsive to other directory number indications for directing said automatic switching equipment to seize said starting circuit, means responsive to seizure of said starting circuit during said predetermined time interval for starting said routiner, means responsive to said starting means for individually associating said control means with a particular one of said offices to control said connecting means in that office, and means responsive to said associating means for causing said control means to transmit the proper number of digit pulse trains to said connecting means.

13. The telephone system of claim 12, and means for returning a tone over said automatic switching equipment as an indication that said routiner has started.

14. The telephone system of claim 12, and means for marking said starting circuit as busy at all times except during said predetermined time interval.

15. A telephone system comprising a plurality of offices each serving a plurality of subscriber lines, means common to said offices for routine testing subscriber lines, connecting means in each of said offices for individually connecting said subscriber lines served by that office to said routine means; said routine means including testing means for testing said subscriber lines and common control means for controlling said connecting means; means having two points of access for starting said routine means, one of said points of access comprising a priming circuit and the other of said points of access comprising a starting circuit, means for normally marking said starting circuit as busy; automatic switching equipment for completing telephone calls through said telephone system responsive to the transmission of directory number indications, means responsive to particular directory number indications for directing said automatic switching equipment to seize said priming circuit, means responsive to said seizure of said priming circuit for measuring a predetermined time interval, means for removing said busy marking during said predetermined time interval, means responsive to other directory number indications for directing said automatic switching equipment to seize said starting circuit, means responsive to said seizure of said starting circuit during said predetermined time interval for starting said routiner, means for returning a tone over said automatic switching equipment as an indication that said routiner means has started; means for individually associating said common-control means with any particular one of said offices to control said connecting means at said particular office, said common control means having capacity to sequentially control said connecting means, and means for causing said common control means to skip the transmission of digit pulse trains that identify predetermined ones of said connecting means.

References Cited in the file of this patent

UNITED STATES PATENTS

| | | |
|---|---|---|
| 2,632,817 | Kessler | Mar. 24, 1953 |
| 2,680,161 | Clement | June 1, 1954 |
| 2,719,886 | Shoffstall | Oct. 4, 1955 |
| 2,806,093 | Pharis | Sept. 10, 1957 |
| 2,883,470 | Jacoby | Apr. 21, 1959 |